United States Patent [19]  
Anderson et al.

[11] 4,146,163  
[45] Mar. 27, 1979

[54] PRODUCTION OF ALUMINUM BRAZING SHEET

[75] Inventors: William A. Anderson, Pittsburgh, Pa.; George D. Wilkinson, Maryville, Tenn.; William D. Vernam, New Kensington, Pa.

[73] Assignee: Aluminum Company of America, Pittsburgh, Pa.

[21] Appl. No.: 849,998

[22] Filed: Nov. 9, 1977

[51] Int. Cl.² .............................................. B23K 19/00
[52] U.S. Cl. .................................... 228/158; 228/190; 228/235; 228/238; 228/263; 428/654
[58] Field of Search ............... 228/158, 190, 235, 238, 228/243, 263; 29/527.7; 72/366, 700; 428/654

[56] References Cited

U.S. PATENT DOCUMENTS

| | | | |
|---|---|---|---|
| 2,800,709 | 7/1957 | Gaul | 228/243 X |
| 2,821,014 | 1/1958 | Miller | 428/654 |
| 3,321,828 | 5/1967 | Miller | 228/220 |
| 3,788,824 | 1/1974 | Singleton et al. | 428/654 |
| 3,853,547 | 12/1974 | Singleton | 75/147 |
| 3,891,400 | 6/1975 | Robinson | 428/654 |
| 3,963,453 | 6/1976 | Singleton | 428/654 |
| 3,963,454 | 6/1976 | Singleton | 428/654 |
| 3,994,695 | 11/1976 | Setzer et al. | 428/654 |

OTHER PUBLICATIONS

"Aluminum 3003" Alloy Digest, No. Al-31, Dec. 1973.

Primary Examiner—C.W. Lanham  
Assistant Examiner—K. J. Ramsey  
Attorney, Agent, or Firm—Andrew Alexander

[57] ABSTRACT

Aluminum brazing sheet is produced from a composite assembly comprising an ingot of aluminum alloy, at least one side of the ingot provided with a layer of an aluminum brazing alloy consisting essentially of not greater than 0.35 wt.% magnesium and 6.0 to 13.0 wt.% silicon, the remainder aluminum and incidental impurities. A layer of aluminum for rolling purposes is provided on at least one of said ingot and said brazing layer, the rolling layer being substantially free of elemental silicon and consisting essentially of 0.2 wt.% Cu max., 0.4 wt.% Fe max., 0.05 wt.% max. for both Mn and Ti, up to 1.0 wt.% Mg, the remainder aluminum and incidental impurities. The composite assembly is hot bonded by rolling in a reversing mill and thereafter formed into brazing sheet in a continuous rolling mill.

10 Claims, 2 Drawing Figures

PRODUCTION OF ALUMINUM BRAZING SHEET

INTRODUCTION

This invention relates to aluminum brazing sheet and more particularly to a method of producing brazing sheet having a very low magnesium content.

In the prior art, it is known that brazing may be used to join pieces of aluminum together by employing a low-melting aluminum-silicon alloy and a suitable flux in a brazing furnace operating at a temperature between the melting temperature of the aluminum-silicon alloy and that of a higher melting alloy being joined. It is also known that aluminum structural members, i.e., the higher melting alloy being joined, and the brazing alloy may be bonded together by hot rolling to form a composite sheet having the brazing alloy on one or both surfaces thereof and the higher melting alloy constituting the core of the sheet. The resulting composite is employed in making brazed assemblies.

In the prior art it is also known that fluxless brazing may be used to join pieces of aluminum together by exposing the surfaces to be joined to magnesium vapor during the brazing operation. This method of brazing is taught in U.S. Pat. No. 3,321,828. The magnesium may be provided at the juncture to be joined in the form of an aluminum brazing sheet containing magnesium and silicon. Magnesium has a comparatively high vapor pressure. Thus, Robinson U.S. Pat. No. 3,891,400 teaches that to prevent premature vaporization during the brazing operation, the magnesium containing member, e.g. aluminum brazing alloy consisting essentially of 5.0 to 15.0 wt. % Si, 0.5 to 5.0 wt.% Mg, max. 0.8 wt.% Fe, max. 0.25 wt.% Cu, max. 0.2 wt.% Zn, max. 0.2 wt.% Mn, should be clad with a magnesium-free aluminum alloy.

The production of brazing sheet on an aluminum core is not without problems. For example, when rolling an ingot clad on one side with brazing sheet, often it will be found that the slab being formed tends to bow or curl making further rolling of it difficult without damaging the rolling equipment. Furthermore, in reducing such slab to brazing sheet thickness in a continuous mill, other problems such as cobbling, can result, i.e. accumulations of sheet between rolling stands due to slippage and failure of the rolls to grip the sheet as it is fed into succeeding rolling stands. Such rolling problems can result in as much as 50 percent of the metal being scraped. Thus, it will be appreciated that, in addition to the scrap loss, considerable expense can be incurred in downtime in correcting the bowing or cobbling problems.

The present invention permits the production of brazing sheet in a highly economical manner by utilizing a process which substantially eliminates the problems of bowing or curling and cobbling during the rolling operation.

SUMMARY OF THE INVENTION

An object of this invention is to provide a composite assembly of rolling into brazing sheet.

Another object of this invention is providing an aluminum brazing sheet having a core of an aluminum alloy, a brazing alloy having a very low magnesium content clad on at least one side of the core, and a layer of aluminum substantially free of elemental silicon on the outside of the assembly used for rolling purposes.

Yet another object of the invention is to provide a method for the production of brazing sheet having a very low magnesium content.

These and other objects will become apparent from the drawings, specification and claims attached hereto.

Alumunim brazing sheet is produced from a composite assembly comprising an ingot of aluminum alloy having at least on one side thereof a layer or slab of an aluminum brazing alloy having a very low magnesium content and consisting essentially of 6.0 to 13.0 wt.% silicon, the remainder aluminum and incidental impurities. For rolling purposes, a layer of substantially silicon-free aluminum is provided on at least one of said ingot and said brazing layer, the rolling layer consisting essentially of 0.2 wt.% Cu max., 0.4 wt.% Fe max., 0.05 wt.% max. for both Mn and Ti, up to 1.0 wt.% Mg, the remainder aluminum. The composite assembly is hot bonded in a reversing rolling mill by rolling at a temperature in the range of 850 to 950° F. and brazing sheet is formed by rolling in a continuous rolling mill.

DETAILED DESCRIPTION OF THE PREFERRED EMBODIMENTS

Figure 1:
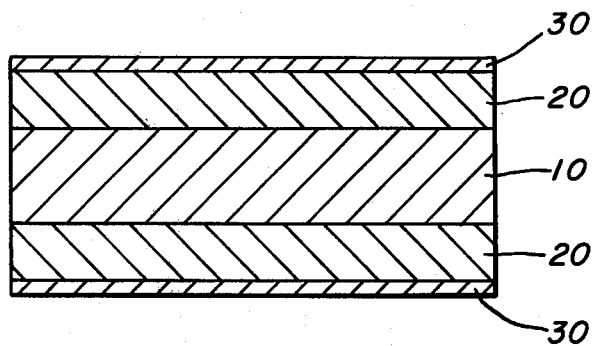
FIG. 1 depicts a cross section of aluminum brazing sheet having multiple brazing layers in accordance with the invention.
Figure 2:
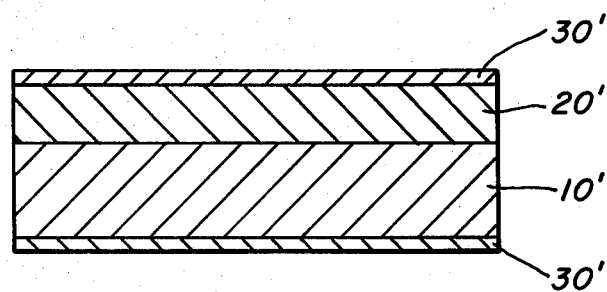
FIG. 2 depicts a cross section of aluminum brazing sheet having a single brazing layer in accordance with the invention.

By reference to FIGS. 1 and 2, it will be seen that the brazing sheet produced by the method of the present invention comprises an aluminum core 10, at least one aluminum brazing layer 20 provided on the core and aluminum layers 30 used for rolling purposes.

The core alloy should be selected to provide maximum strength and resistance to corrosion. Thus, the core alloy can contain 1.5 wt.% Mn max., 0.3 wt.% Si max., and preferably 0.2 wt.% Si max., 0.7 wt.% Mg max., and preferably 0.5 wt.% Mg max., 0.7 wt.% Fe max., 0.25 wt.% Cu max., 5.0 wt.% Zn max., and 0.25 wt.% Cr max., the remainder aluminum and incidental impurities. Such alloys can include aluminum alloys such as 3003, 3105, 3005, 6951 and the like. However, the silicon content of these alloys should be controlled as noted above in order to preserve the structural integrity of the component after brazing.

It is important that silicon content of the core alloy be controlled in order to prevent silicon penetration thereinto from the brazing layer. It is known that silicon penetration of the core alloy can cause severe melting along grain boundaries during the brazing operation. That is, melting can occur in the core material as a result of silicon penetrating or diffusing into the core from the brazing layer. Long heating times during the brazing operation also tend to promote penetration of the core alloy by silicon. In addition, grain size is important in that small grains also tend to promote the penetration of the core by silicon. It should be noted that the silicon penetration is highly undesirable since it can result in sagging of the structural member and can also result in integranular corrosion, thereby diminishing the useful life of the structural member. Thus, to provide optimum grain size, that is, grain size most resistant to silicon penetration, iron is preferably maintained in the range of 0.2 to 0.5 wt.%.

With respect to the brazing material composition, for purposes of obtaining high quality joints between aluminum components during the brazing operation, it should have a very low magnesium content. That is, the magnesium content of the brazing layer must not exceed 0.35 wt.% and preferably should be in the range of 0.05 to 0.25 wt.% Mg. It is important that these limits on magnesium be closely adhered to in order to prevent the formation of excessively thick magnesium oxide layers on the aluminum brazing alloy surface during annealing operations on the sheet in the course of its manufacture. Thick magnesium oxide layers can result in much greater difficulty in obtaining sound or high quality joints between the aluminum components during the brazing operation. That is, low amounts of magnesium in the brazing material result in correspondingly less magnesium diffusion and thus thinner magnesium oxide layers which do not adversely interfere with the brazing operation. For example, it has been discovered that when aluminum alloys such as 3003 which contains traces of magnesium were exposed to about 400° C. in dried air, it developed an oxide matrix which appeared uniform and continuous. X-ray diffraction analysis of the oxide revealed that it consisted primarily of gamma alumina with a noted absence of MgO. By comparison, samples of aluminum alloy 3004 containing 0.3 to 1.3 wt.% Mg and oxidized in dired air at 400° C. developed oxide films which were discontinuous. Analysis of such oxide films revealed the presence of a rough layer of MgO on the surface of the film. It is this layer of MgO referred to earlier that is best avoided in order to achieve high quality joints during the brazing operation. Thus, high quality joints are obtained by controlling the amount of magnesium in the brazing alloy.

In addition to magnesium being present in controlled amounts, the brazing alloy contains silicon in the range of 6.0 to 13.0 wt.%, with a preferred amount of silicon being in the range of 6.5 to 12.0 wt.%, the remainder essentially aluminum and incidental impurities.

A layer 30 of relatively high purity, substantially silicon-free aluminum alloy is provided so as to clad core 10 and the brazing layer 20 as depicted in the figures. By substantially silicon-free aluminum alloy is meant an aluminum alloy substantially free from eutectic or elemental silicon and generally having less than 0.4 wt.% Si and preferably not more than 0.2 wt.% Si present. The alloy should contain not more than 0.7 wt.% Fe and preferably not more than 0.4 wt.% Fe. The amount of copper present in the alloy should not be more than 0.2 wt.%, preferably 0.1 wt.%, with the amount of Mn being not more than 1.5 wt.% and preferably less than 0.3 wt.%. Magnesium can be present in the alloy up to 1.0 wt.% with magnesium being present typically in the range of 0.1 to 0.8 wt.%. In addition, the manganese plus magnesium should not exceed 1.5 wt.%. Zinc may be present up to 3.0 wt.% with a preferred maximum being 2.5 wt.%. If desired for improved brazed components, at least one of the group consisting of bismuth, lead and tin up to 0.2 wt.% may be added to rolling layer 30. The remainder of the alloy should consist essentially of aluminum and incidental impurities.

In fabrication of brazing sheet in accordance with the principles of the present invention, an ingot of aluminum alloy for use as the core 10 is first normally scalped to remove surface irregularities therefrom. After scalping, the ingot normally has a thickness in the range of 10 to 20 inches. An ingot of brazing alloy which has been previously wrought or formed into a slab having typically a thickness in the range of 1 to 3 inches is secured as by straps or the like to the ingot for use as the core to provide a composite assembly. For rolling purposes, a layer of the substantially silicon-free alloy is also secured to the outside surfaces of the assembly to provide a composite after rolling substantially as shown in FIG. 2. The layer can range from 0.25 to 1.0 inches thick and should constitute 0.5 to 10.0% of the final composite assembly. It should be understood that the stock used for the rolling layer may be bonded to the brazing alloy as by hot rolling prior to being secured to the ingot used for the core material. Other combinations may be used as long as the above thicknesses are maintained. For purposes of bonding the composite, it is first heated to a temperature in the range of 850° to 950° F. and then hot rolled in a reversing mill to a thickness in the range of about 2.0 to 4.0 inches. During such rolling, because of the silicon-free layer, the top and bottom rolls on the reversing mill encounter identical alloys which prevent bowing or curling of the assembly as it is rolled. The silicon-free layer is important for additional reasons as discussed hereinafter.

While the inventors do not necessarily wish to be held to any theory of invention, it is believed that one cause of the bowing or curling of an assembly with different alloys on the top and bottom surfaces results from different coefficients of friction between the alloys and the rolls. This causes one alloy to elongate faster than the other. However, as noted, in the present invention, when a layer of substantially silicon-free alloy is provided on the core and on the brazing layer both rolls encounter the same alloy, substantially eliminating the bowing problem.

To further reduce the composite to brazing sheet thickness, e.g. 0.012 to 0.125 inch, it is passed through a continuous rolling mill. It is in this rolling operation that a substantially silicon-free layer has particular significance. In the continuous mill, the presence of eutectic silicon in the outer or cladding layer can result in serious cobbling problems which, as explained earlier, is an accumulation of brazing sheet between stands in the continuous rolling mill. Obviously, these accumulations twist, score and distort the sheet resulting in downtime of the mill for its removal. The problem is further compounded by the fact that prior rolling operations are severely curtailed and very often partially rolled ingot and slab must be returned for heating to suitable rolling temperatures which, obviously is very inefficient and greatly increases the heating energy requirements for rolling.

The cobbling results mostly from the presence of eutectic or elemental silicon in the cladding or outer layer. That is, elemental silicon in the cladding results in a surface which provides low friction and poor gripping or entry characteristics with respect to the rolls of the continuous rolling mill. To achieve entry to the mill, it may be necessary to schedule smaller gauge reductions which are inefficient and may require additional rolling passes to reach the desired sheet thickness, an expensive and energy-consuming operation. Thus, in a multi-stand mill, i.e. a continuous rolling mill, a rolling stand may have satisfactory friction and entry characteristics with respect to the sheet and gauge of the brazing alloy and the next stand may have unsatisfactory friction and gripping characteristics for reduction required for efficient operation, resulting in an accumulation of sheet between the stands or the cobbling problem.

It should be noted that a layer of an aluminum alloy, e.g. 1100, 1145, 3003, 7072 or the like, may be interposed between the brazing layer and the core material, if desired.

In the continuous rolling operation, it is preferred to keep the temperature of the sheet between 500° to 800° F. In certain instances, when it is desired to cold roll the brazing sheet to gauges less than 0.125 inch, it may be desirable to anneal the sheet prior to such cold rolling. For annealing purposes, the sheet should be subjected to a temperature of about 600° to 700° F. for a period in the range of 1 to 2 hours.

The present invention is highly advantageous in that it permits the efficient production of brazing sheet as depicted in the figures. It will be appreciated that brazing sheet as depicted has many applications including, for example, radiator tubes and the like. In addition, the present invention is advantageous in that it permits highly efficient rolling of one layer sheet.

Also, because of the control provided in the composition of the core alloy, it is substantially free from penetration by silicon. Thus, problems such as intergranular corrosion and sagging of the core are practically eliminated.

While this invention has been described in terms of preferred embodiments, the claims appended hereto are intended to encompass other embodiments which fall within the spirit of the invention.

We claim:

1. A method of producing aluminum brazing sheet comprising the steps of:
   (a) providing a composite assembly comprising
      (i) an ingot of aluminum alloy; and
      (ii) at least one side of the ingot provided with a layer of an aluminum brazing alloy consisting essentially of 6.0 to 13.0 wt.% silicon and 0.05 to 0.35 wt.% magnesium, the remainder aluminum and incidental impurities;
   (b) providing on at least one of said ingot and said brazing layer a layer of aluminum for rolling purposes, the layer consisting essentially of 0.2 wt.% Si max., 0.2 wt.% Cu max., 0.4 wt.% Fe max., 0.05 wt.% max. for both Mn and Ti, up to 1.0 wt.% Mg, the remainder aluminum and incidental impurities;
   (c) hot bonding the composite assembly and the rolling layers to form a composite by rolling at a temperature in the range of 850° to 950° F. in a reversing mill; and
   (d) continuously hot rolling the composite to form brazing sheet.

2. The method according to claim 1 wherein the ingot of aluminum alloy consists essentially of 0.3 to 1.5 wt. % Mn, 0.15 to 0.3 wt. % Si, maximum 0.7 wt. % Fe, the remainder aluminum.

3. The method according to claim 2 wherein the iron is maintained in the range of 0.2 to 0.45 wt.%.

4. The method according to claim 1 wherein the layer of aluminum used for rolling purposes contains 0.1 to 0.8 wt.% Mg.

5. The method according to claim 1 wherein the brazing alloy contains 0.05 to 0.25 wt.% magnesium.

6. The method according to claim 1 wherein the composite is continuously rolled at a temperature in the range of 500° to 800° F.

7. The method according to claim 1 wherein the elemental silicon is less than 0.15 wt.%.

8. A method of producing aluminum brazing sheet comprising the steps of:
   (a) providing a composite assembly comprising
      (i) an ingot of aluminum alloy; and
      (ii) at least one side of the ingot provided with a layer of an aluminum brazing alloy consisting essentially of 6.0 to 13.0 wt.% silicon and 0.05 to 0.35 wt.% magnesium, the remainder aluminum and incidental impurities;
   (b) providing on at least one of said ingot and said brazing layer a layer of aluminum for rolling purposes, the layer being substantially free of elemental silicon and consisting essentially of 0.2 wt.% Cu max., 0.4 wt.% Fe max., 0.05 wt.% max. for both Mn and Ti, up to 1.0 wt.% Mg, and up to 0.2 wt.% of at least one of the group consisting of Bi, Pb and Sn, the remainder aluminum and incidental impurities;
   (c) hot bonding the composite assembly and the rolling layers to form a composite by rolling at a temperature in the range of 850° to 950° F. in a reversing mill; and
   (d) continuously hot rolling the composite to form brazing sheet.

9. A method of producing aluminum brazing sheet comprising the steps of:
   (a) providing a composite assembly comprising
      (i) an ingot of aluminum alloy consisting essentially of 0.3 to 1.5 wt.% Mn, 0.15 to 0.3 wt.% Si, 0.2 to 0.45 wt.% Fe, the remainder aluminum; and
      (ii) at least one side of the ingot provided with a layer of an aluminum brazing alloy consisting essentially of 6.5 to 12.0 wt.% silicon and 0.05 to 0.25 wt.% magnesium, the remainder aluminum and incidental impurities;
   (b) providing on at least one of said ingot and said brazing layer a layer of aluminum for rolling purposes, consisting essentially of 0.2 wt.% Si max., 0.2 wt.% Cu max., 0.4 wt.% Fe max., 0.05 wt.% max. for both Mn and Ti, up to 1.0 wt.% Mg, the remainder aluminum and incidental impurities;
   (c) hot bonding the composite assembly and rolling layers to form a composite by rolling at a temperature in the range of 850° to 950° F. in a reversing mill; and
   (d) continuously hot rolling the composite at a temperature in the range of 500° to 800° F. to form brazing sheet.

10. The method according to claim 8 wherein the layer of aluminum used for rolling purposes contains 0.1 to 0.8 wt.% Mg.

* * * * *